Jan. 27, 1953 W. G. HARDY ET AL 2,626,671
POWER STEERED GARDEN TRACTOR
Filed April 23, 1949 3 Sheets-Sheet 1

INVENTORS
WILBUR G. HARDY
MELVIN S. BURKHOLDER

By *Toulmin & Toulmin*
ATTORNEYS

Jan. 27, 1953  W. G. HARDY ET AL  2,626,671
POWER STEERED GARDEN TRACTOR
Filed April 23, 1949  3 Sheets-Sheet 2
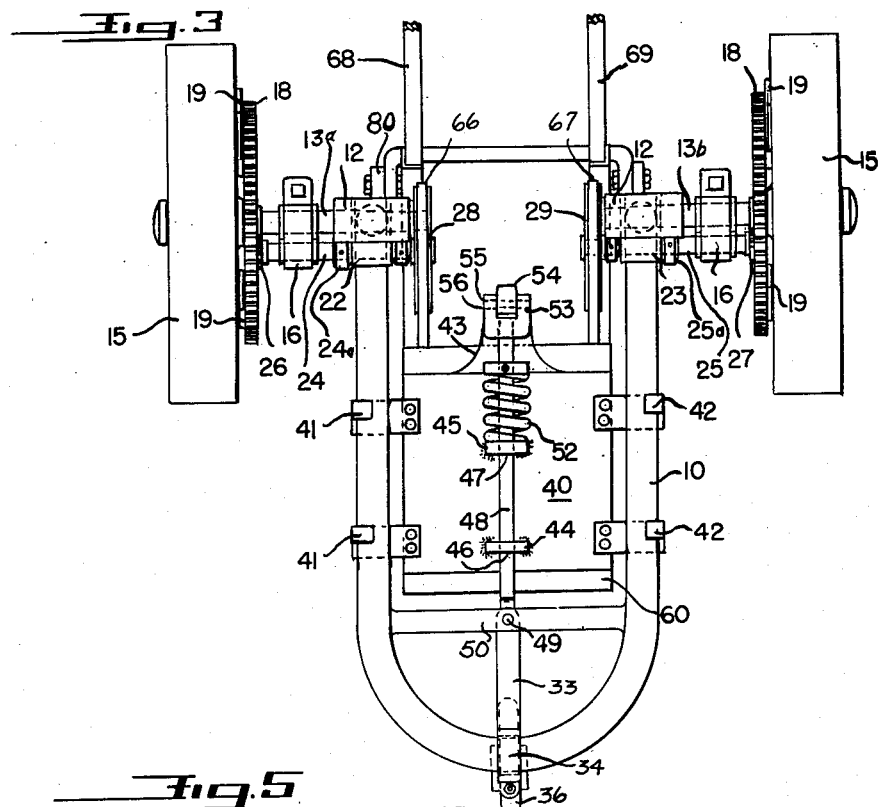
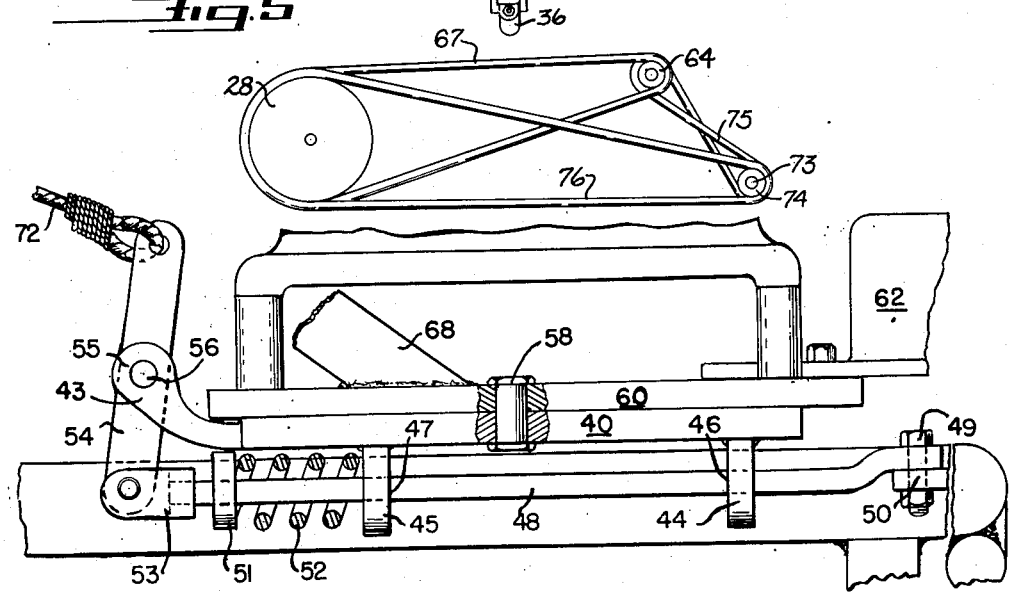
INVENTORS
WILBUR G. HARDY
MELVIN S. BURKHOLDER
By Toulmin & Toulmin
ATTORNEYS Jan. 27, 1953   W. G. HARDY ET AL   2,626,671
POWER STEERED GARDEN TRACTOR
Filed April 23, 1949   3 Sheets-Sheet 3

INVENTOR
WILBUR G. HARDY
MELVIN S. BURKHOLDER
BY Toulmin & Toulmin
ATTORNEYS

Patented Jan. 27, 1953

2,626,671

UNITED STATES PATENT OFFICE 2,626,671

POWER STEERED GARDEN TRACTOR

Wilbur Glenn Hardy, Wapakoneta, and Melvin S. Burkholder, Beaverdam, Ohio

Application April 23, 1949, Serial No. 89,238

11 Claims. (Cl. 180—6.66)

This invention relates to multi-purpose garden tractors. More particularly it relates to garden tractors whose steering is accomplished through the driving mechanism. Still more particularly it relates to power steering mechanism without differentials for independent control of each wheel.

In garden tractors thus far produced, so far as we are aware, the steering and control has been either through manual force upon the handles or by a differential on the drive shaft, whereby upon braking one wheel to cause its retardation the other wheel is speeded up due to the action of the differential, or by the clutch mechanisms to control the individual wheels.

These methods have all been unsatisfactory in many respects. Differential and clutch mechanisms are expensive. In addition they add to the weight and limit the extent to which the size of the tractor can be reduced. In addition all of these mechanisms require the positioning of wheels in a fixed relationship to the driving mechanism.

It is a primary object of this invention to provide a tractor whose motive power can be directed to individual wheels at will.

It is another object of this invention to provide a tractor whose motive power can be shut off from ground wheels, thus enabling the stopping of the tractor at will.

It is another object of this invention to provide a tractor wherein the application of power and the steering is attained by a novel construction permitting sharp turning.

It is another object of this invention to provide a tractor having a power drive which allows adjustment of the spacing between the ground wheels.

It is another object of this invention to provide a tractor capable of straddling rows of vegetation without injuring the growth.

Another object of this invention is to provide a tractor whose power drive is reversible on individual wheels.

It is a still further object to provide a tractor thoroughly reliable, and efficient in operation, easily handled, and comparatively inexpensive to manufacture.

It is another object of this invention to provide a tractor upon which may be mounted auxiliary equipment.

Other and more specific objects and advantages will appear from the following description of a tractor constructed according to the present invention.

The invention consists in the features of construction, combination and arrangement of the parts as will hereinafter be more fully described and illustrated in the accompanying drawings which disclose a preferred embodiment.

In the accompanying drawings:

Figure 3 is a horizontal view of the tractor from the bottom;

Figure 4 is a fragmentary elevational view of the motor mounting;

Figure 6:
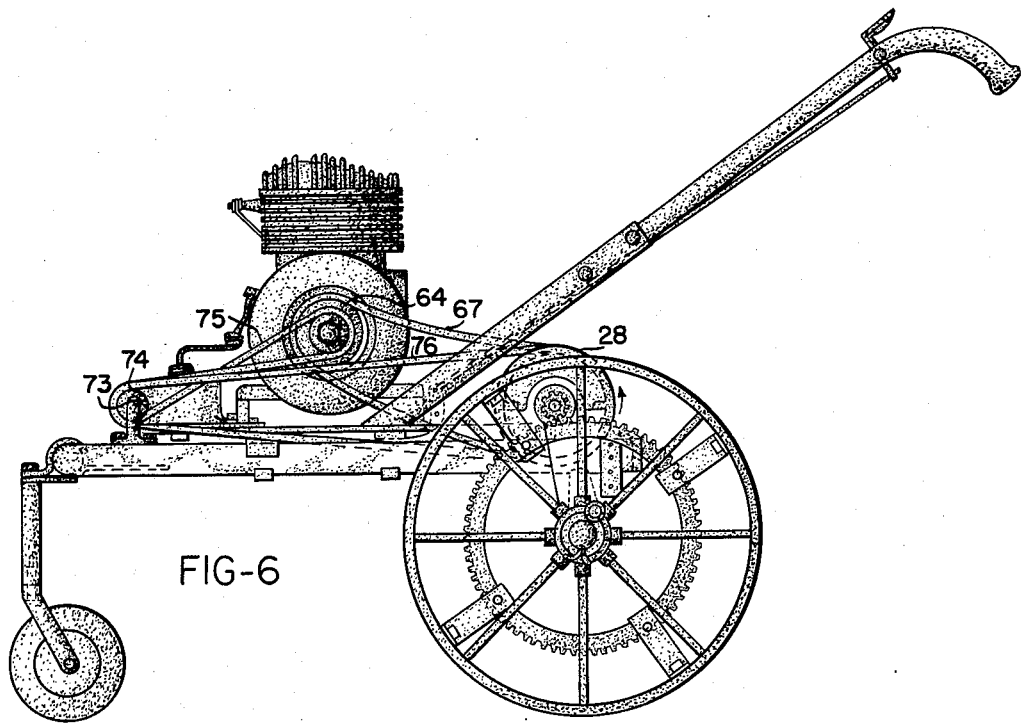

Figure 5 diagrammatically illustrates drive mechanism permitting reversing the power drive;

Figure 6 illustrates a reversing drive mounted on the garden tractor; and

Figure 7:
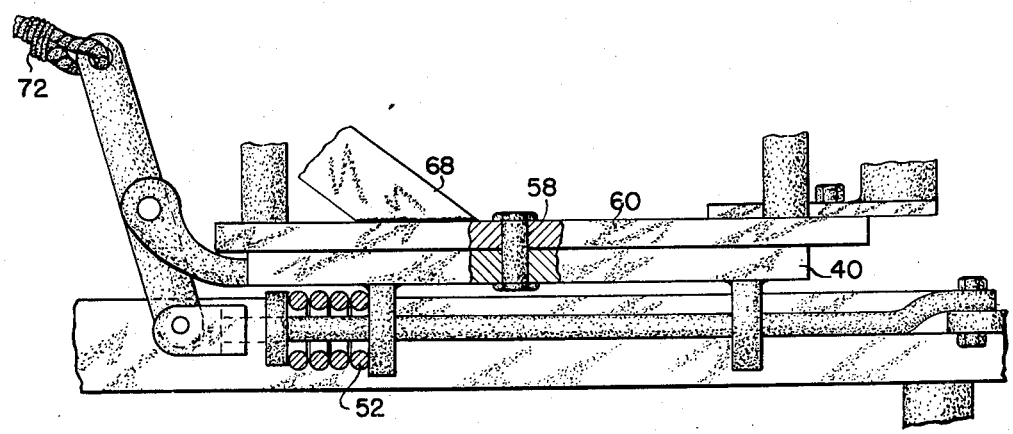

Figure 7 illustrates the position of the spring in reverse drive.

Referring to the figures of the drawings, it will be noted that the main frame includes a U-shaped horizontal member 10, which may have the parallel members joined for rigidity as by a brace bar, and which has depending legs 11 adapted at their lower ends with bearing means or journals 12.

In the journals are mounted the halves of the axially aligned shaft 13 divided into two portions 13a and 13b. Rotatably mounted on the bearing portions 13c and 13d of each shaft 13 are ground wheels 15. Each ground wheel is held in position between a shoulder and suitable retaining means 14 as, for example, a bearing plate engaged by a pin or a nut threadedly mounted on the shaft.

Intermediate the wheel 15 and the bearing 12 the shaft is enclosed by a bearing 16 of a connecting member or arm 17, whose purpose is hereinafter explained.

Wheel 15 is provided on its inner side with a ring gear 18 which may be formed integral therewith or attached by suitable means, such as lugs 19, removably affixed to the wheel 15 by bolts 20.

On the side opposite shaft portion 13a, the identical construction is maintained for shaft portion 13b. These corresponding parts are marked with the same numbers 15 through 20.

Mounted in axial alignment adjacent the rear of the U-shaped frame member 10 are a pair of bearings 22 and 23, in which are rotatably mounted the halves of the shaft divided into two portions 24 and 25. Said shaft portions 24 and 25 have attached to their exterior ends by suitable means, such as keys, press fit and the like, pinion gears 26 and 27 adapted to cooperate with ring gears 18.

Shaft members 24 and 25 are provided on the same side of the bearings as the pinion gears, but mounted adjacent the bearing, with collars 24a and 25a. On the opposite sides of the bearings 22 and 23 from the pinion gears 26 and 27 there are releasably attached sheaves 28 and 29. Intermediate the pinion gears 26 and 27 and the bearings 22 and 23, the shaft members 24 and 25 are enclosed by the bearings 30 of said connecting member 17, thus providing rigid support at extended positions.

A support member giving the frame three point ground contact may be provided as shown at 32. The illustrated support consists of a pivot arm 33 pivotally mounted to swing through 180 degrees and having a clamp 34 at the exterior end for engagement with the frame 10 to lock the arm in any angular position.

Depending from the pivot arm 33 is a frame 35 in which is mounted a wheel 36.

It will be recognized that other types of support means may be substituted for the above caster mechanism.

Extending between the side members of the U-shaped frame 10 is a plate 40. Plate 40 is supported by four clips, two on the leftwardly side indicated at 41 and two on the rightwardly side indicated at 42. The clips 41 and 42 are adapted to be slidable on the side members of frame 10 as guides. Plate 40 is provided with a rearwardly extending ear or clevis 43 attached by suitable means, such as welding, rivets or bolts.

Depending from the plate 40 are rigidly attached arms 44 and 45, which are apertured as at 46 and 47 to receive a guide rod 48. Guide rod 48 passes through the apertures and is restrained from forward movement by attachment through suitable means 49, such as a bolt, to a cross beam 50.

Said rod 48 extends rearwardly through the arms 44 and 45 and is provided with a collar 51. Rod 48 is enclosed between the collar 51 and arm 44 by a spring 52. Rod 48 is also provided at its rearwardly end with a detachable clevis 53. Pivotally mounted in the clevis 53 of rod 48 is a link 54 apertured at 55 to receive a pin 56 securing the link to the clevis 43 of plate 40.

Link 54 is apertured at its free end to receive actuating means hereinafter explained.

Plate 40 carries at the vertical central axis of the frame 10 a kingpin 58 the kingpin and plate being suitably engaged in a press fitting relation or held together by a bolt. Said kingpin 58 and plate 40 carry a turntable 60, which is revoluble in the horizontal plane as by a sliding fit between the pin 58 and plate 60. Said turntable carries the power means 61, such as, for example, a 1½ horsepower gasoline engine and a fuel tank 62.

Extending from both sides of the motor is a drive shaft 63. Said shaft carries the sheaves 64 and 65 which are in vertical alignment with the sheaves 28 and 29, to which they transmit power through belts 66 and 67.

Turntable 60 has joined thereto and extending rearwardly guide means, such as handles, 68 and 69 rigidly joined by a cross bar 70. A lever 71 pivoted on the cross bar 70 is operatively connected to link 54 by suitable means 72, such as wire or rope.

The arrangement of the above described apparatus is such that upon release of lever 71 the link 54 is eased forward and the plate 40 urged by spring 52 moves the entire power deck forwardly, creating driving tension on the belts 66 and 67 connecting sheaves 64 and 28 and sheaves 65 and 29, respectively.

It is, of course, understood that when the belts 66 and 67 are thus tightened, the pulleys being continuously driven, cause a continuous operation of shafts 24 and 25 and pinions 26 and 27 and ring gears 18. The traction wheels 15 are thus driven at equal speed and the tractor advances along a straight course, towing whatever implements may be attached to the tractor through suitable means such as the arms 80 depending from frame 10.

For steering purposes all that is needed is a leftwardly or a rightwardly shift of the handles. The shift of the handles, for example, to the left rotates turntable 60 thus rearwardly moving the sheave 64 and releases the tension on belt 66 while the forward movement of sheave 65 tightens belt 67.

The displacement of the motor is compensated for by the tension on the belt 67, causing the plate 40 to retract against the pressure of spring 52. Thus the belt is not over-stretched, but merely held in driving tension. With the driving of belt 67 only right wheel 15 is rotated and thus the tractor is caused to make a sharp left turn.

The position of either wheel 15 is alterable at will. If both wheels are brought to their innermost positions the inner shaft member 13 and the shaft members 24 and 25 abut.

When it is desirable to alter the distance between the drive wheels, the tightening screws of the sheaves 28 and 29 and the collars 24a and 25a are loosened, the shafts 24 and 25 slid laterally and the screws retightened.

The shafts upon which are mounted drive wheels 15 may be altered as to distance, for example, by loosening a set screw in each journal, sliding the axle to the desired position and resetting the screw. It will thus be seen that independent adjustment of either wheel may be made in a very short time.

Referring particularly to Figure 5, there is shown a belt arrangement whereby reversible drive is obtained. In this arrangement the sheave 64 is shown connected to the sheave 28 by the continuous belt 67.

Mounted on the frame as shown in Figure 6 is an idler shaft 73 carrying sheave 74. Sheave 74 is driven from sheave 64 by a belt 75. Sheave 28 is connected in driving relationship with the sheave 74 by a belt 76. The sheave 28 in this case is a double notched V wheel.

Figure 1:
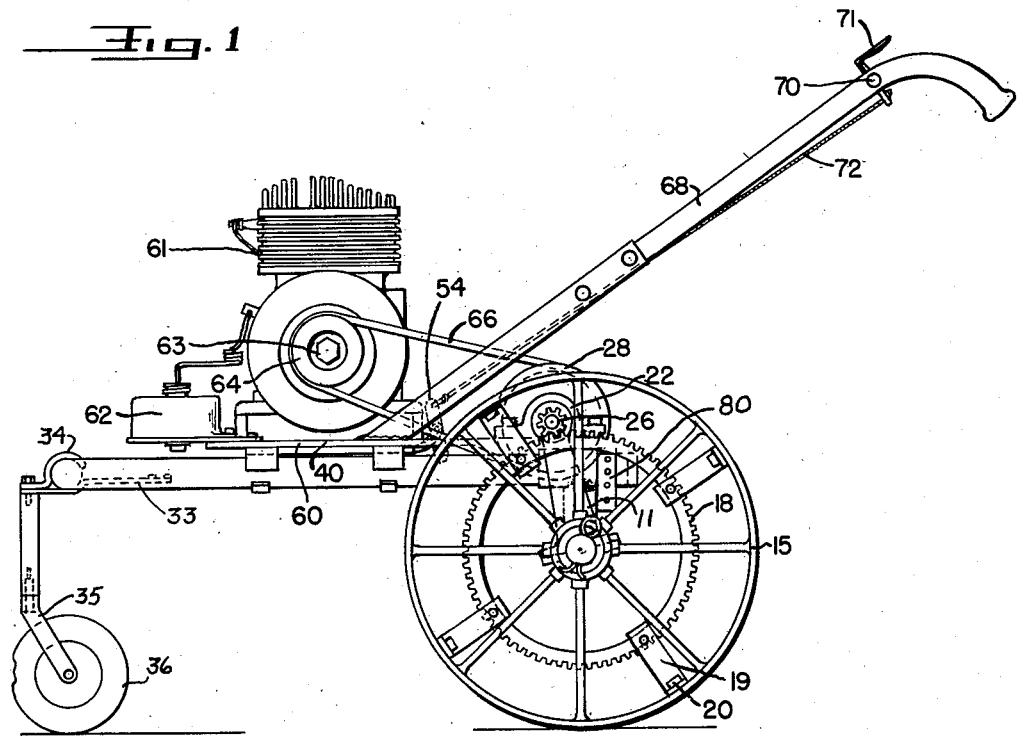
Figure 1 is a side elevational view of our improved garden tractor.
Figure 2:
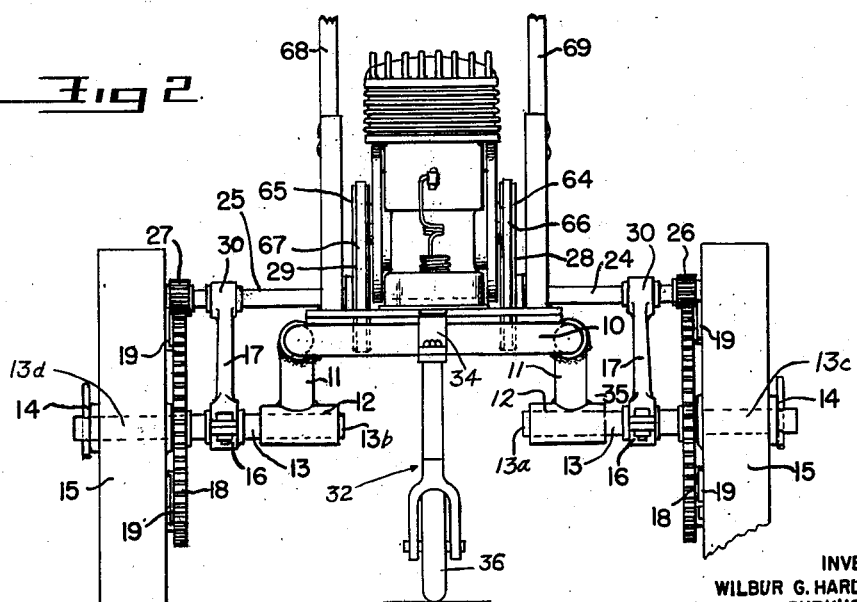
Figure 2 is a front elevational view.

When the motor is in forward position the belt 67 is tensioned, as explained before, and the belt 75 is loose, so that power is not transmitted by this means, power being transmitted for forward motion of the tractor from drive sheave 64 through belt 67 to driven sheave 28. Thus the operation of belt 67 when belt 75 is loose is identical to that described in connection with belts 66 and 67 of Figures 1 to 3, inclusive.

However when a long rearwardly movement of the motor is effected and the unit assumes the position shown in Figure 6 the belt 67 is loosened and the belt 75 comes into tension, thereby driving the sheave 74 and transmitting power to the sheave 28 through the belt 76.

However the direction of motion of driven sheave 28 will, as may be seen from the arrow in Figure 6, be reversed and the tractor will accordingly be placed in reverse motion when belts 75 and 76 are tensioned.

The substitution of the drive shown in Figures 5 and 6 for that previously set forth in connection with Figures 1 to 4, inclusive, accordingly permits not only of forward motion and directional control of the tractor but of reverse motion of the tractor and directional control while in reverse motion, since drives on opposing sides of the motor will be tensioned and untensioned upon turning plate 60 as substantially described hereinbefore. While spring 52 will be placed in compression by this action and tension on member 72 must be employed to overcome this, this is not a detrimental feature since under normal operating conditions the unit will be in reverse motion only for short periods.

Although a specific embodiment of the invention has been illustrated and described, it will be understood that various alterations in the details of construction may be made within the scope of the invention as indicated by the appended claims.

We claim:

1. In a garden tractor the combination comprising a frame supported by independently revoluble ground wheels, driving means for said wheels, a horizontal platform slidable forwardly and rearwardly mounted on said frame, a revoluble mount supported by said platform and positioned through a pivot, power means supported on said revoluble mount, parallel endless belt means spaced on opposite sides of said pivot connecting said power means to said driving means, guide means attached to said revoluble mount for turning the power means in a horizontal plane whereby one belt means may be tensioned while the other belt is disengaged, and manually operable means associated with said guide means for actuating said platform into simultaneous belt tensioning or belt loosening position.

2. In a garden tractor the combination comprising a frame supported by ground wheels, a horizontally slidable member mounted on said frame, tensioning means urging the slidable member into forward effective driving position, a horizontally revoluble member carried by said slidable member, a power unit supported by said revoluble member, pulley means on said power unit positioned on opposite sides of said unit, rotatable shaft means supported by said frame, driven and driving means on said shaft means, individual endless belts passing over the pulley of the power unit and the driven means on said shaft means, gear members on said wheels meshing with said driving means on said shaft, rearwardly extending guide means attached to said revoluble member for turning said member to render one belt ineffective while rendering the other effective, and manually operable means associated with said guide means for retracting the slidable member to render said endless belts completely ineffective.

3. In a garden tractor, the combination comprising a frame supported by ground wheels, a horizontally slidable table mounted on said frame, tensioning means urging said table into forward effective driving position, a horizontally revoluble member carried by said slidable table, a power unit supported by said revoluble member, pulleys on opposite sides of the power unit on the drive shaft thereof, aligned shafts journaled for rotation supported on said frame, a sheave and pinion gear mounted on each shaft, endless belts each passing over a pulley of said power unit and a sheave on said shaft, gear members on said wheels meshing with the pinion gear on said shaft, rearwardly extending guide means attached to said revoluble member for turning said member to render one belt ineffective while rendering the other effective, and manually operable means associated with said guide means for retracting the slidable member to render said endless belts completely ineffective.

4. In a garden tractor, the combination comprising a frame supported by ground wheels each having its own shaft member, a horizontally slidable table mounted on said frame, tensioning means urging said table in forward effective driving position, a horizontally revoluble member carried by said slidable table, a power unit supported by said revoluble member, pulleys on the opposite sides of the power unit on the drive shaft thereof, individual shaft members journaled for rotation in the axially aligned bearings mounted on said frame, a driven member and a driving member on each of said individual shafts, endless belts each passing over a pulley of the power unit and a driven member, a gear member on each of said wheels meshing with a driving member on one of said individual shaft members, rearwardly extending guide means attached to said revoluble member for turning said member to render one belt ineffective while rendering the other effective, and manually operable means associated with said guide means for retracting the slidable member to render said endless belts completely ineffective.

5. In a garden tractor, the combination comprising a frame supported by ground wheels, a horizontally slidable table mounted on said frame, spring means urging said table into forward effective driving position, a horizontally revoluble member carried by said slidable table, a motor supported by said revoluble member, pulleys on opposite sides of said motor and mounted on the drive shaft thereof, individual shaft members journaled for rotation in the axially aligned bearings mounted on said frame, a sheave and a pinion gear mounted on each individual shaft and on opposite sides of the bearing, endless belts each passing over a pulley of the motor and a sheave of said individual shaft, a gear member on each of said wheels meshing with a pinion gear on one of said individual shaft members, rearwardly extending guide means attached to said revoluble member for turning said member to render one belt ineffective while rendering the other effective, and manually operable means associated with said guide means for retracting the slidable member to render said endless belts completely ineffective.

6. In a garden tractor, the combination comprising a propelled frame, a slidable plate with a rearwardly extending ear supported and guided by said frame, a turntable revolubly attached to said plate, a motor mounted on said turntable, a drive shaft extending laterally from both sides of said motor, pulleys attached to said motor shaft and mounted on opposite sides of said motor, laterally slidable axially aligned halves of a shaft mounted for rotation in journals on said frame, a pinion gear and sheave mounted on each half of the shaft and on opposite sides of said journals, endless belts each passing over the sheave on a shaft and a pulley on said drive shaft, arms depending from the rear of said frame, axially aligned journals mounted on said arms, laterally slidable halves of a second shaft carried in said journals, traction wheels mounted on each half of said second shaft, a ring gear supported on each of said wheels in contact with said pinion gear, handles affixed to said turntable for turning said members to render one endless belt ineffective while tensioning the other into drive relationship, manually operable means associated with said guide means for rearwardly urging the slidable plate to render both endless belts completely ineffective.

7. In a garden tractor, the combination of a power drive and steering means for the wheels of said tractor comprising a horizontally extending frame, a slide mounted on said frame and horizontally movable therealong, a horizontally rotatable mounting carried by said slide, power means including drive pulley means supported on said rotatable mounting, driven pulley means rotatably supported on said frame and adapted to drive said wheels of said tractor individually, power transmission belt means connecting said drive pulley and said driven pulley means, said power means and slide being operable upon rotation and horizontal movement of said power means relative to said frame to tension a drive belt to one of said driven pulleys while loosening a drive belt to the other said driven pulley, whereby said tractor in the operating condition of said power means may be readily steered.

8. In a garden tractor, the combination comprising spaced independently revoluble ground wheels, a horizontally extending frame supported between said spaced wheels, a slide mounted on said frame and horizontally movable therealong, a horizontally rotatable mounting carried by said slide, power means including drive pulley means supported on said rotatable mounting, driven pulley means rotatably supported on said frame and adapted to drive said wheels of said tractor individually, power transmission belts spaced apart on either side of said power means and connecting said drive and driven pulley means, and means, including said slide, to place said belts in tension and to selectively vary the tension of each belt by rotative and horizontal movement of said power means with respect to said driven pulley means and said wheels, whereby one said wheel is operatively connected to said power means and the other said wheel is rendered inoperative with respect to said power means.

9. In a garden tractor, the combination comprising spaced independently revoluble ground wheels, a horizontally extending frame supported between said spaced wheels, a slide horizontally movably mounted on said frame and having yieldable means associated therewith for urging the said slide into a forward driving position, a horizontally rotatable mounting carried by said slide, power means including drive pulley means supported on said rotatable mounting, driven pulley means rotatably supported on said frame and adapted to drive said wheels of said tractor individually, power transmission belts spaced apart on either side of said power means connecting said drive and driven pulley means, and means, including said slide and yieldable means, to place said belts in driving tension and to selectively vary the tension of each belt by rotative and horizontal movement of said power means and slide with respect to said driven pulley means and said wheels, whereby one said wheel is operatively connected with said power means and the other of said wheels is rendered inoperative with respect to said power means.

10. In a garden tractor, the combination comprising spaced independently revoluble ground wheels, a horizontally extending frame supported between said spaced wheels, a slide horizontally movably mounted on said frame and having spring means associated therewith to urge said slide into a forward driving position, a rotatable mounting carried by said slide, power means including drive pulley means supported on said rotatable mounting, power transmission belts on each said drive pulley means drivingly connected with said power means, means for driving each said wheel, said means including spaced parallel shafts, driving and driven gears connecting said shafts and belt pulleys on said drive gear shaft, one said power transmission belt being connected with one said belt pulley on said drive gear shaft to drive said wheels of said tractor individually, and means including said slide and spring to place said belts in driving tension and to selectively vary the tension of each belt by rotative and horizontal movement of said power means with respect to said driving means for each said wheel, whereby one wheel is operatively connected with said power means and the other said wheel is rendered inoperative with respect to said power means.

11. In a garden tractor, the combination of a power drive and steering means for the wheels of said tractor comprising a horizontally extending frame, a slide mounted on said frame and horizontally movable therealong and having yieldable means associated therewith for urging the said slide into a fixed driving position, a rotatable mounting carried by said slide, power means, including driving double V belt pulley means supported on said rotatable mounting on each side of said power means, a fixedly positioned double V belt pulley adapted to be driven and to drive a wheel of said tractor secured adjacent each side of said frame and rearwardly on said slide, a fixedly positioned double V belt pulley adapted to be driven secured to each side of said frame forwardly of said slide, a power transmission belt drivingly connecting each pair of fixed pulleys on each side of said frame, power transmission belts connecting said driving double V belt pulleys of said power means with each of said double V belt pulleys on each side of said frame, each said belt connecting said power means and a said forwardly positioned pulley being crossed, and means secured to said slide to retract said slide rearwardly against the pressure of said yieldable means while rotating said power means.

WILBUR GLENN HARDY.
MELVIN S. BURKHOLDER.

REFERENCES CITED

The following references are of record in the file of this patent:

UNITED STATES PATENTS

| Number | Name | Date |
|---|---|---|
| 441,771 | Mansfield | Dec. 2, 1890 |
| 828,713 | Coffman et al. | Aug. 14, 1906 |
| 1,295,242 | Waite | Feb. 25, 1919 |
| 1,686,372 | Fykse | Oct. 2, 1928 |
| 2,018,624 | Eames | Oct. 22, 1935 |
| 2,329,372 | Hitch | Sept. 14, 1943 |
| 2,450,749 | Clark | Oct. 5, 1948 |